US008751832B2

(12) United States Patent
Cashin et al.

(10) Patent No.: US 8,751,832 B2
(45) Date of Patent: Jun. 10, 2014

(54) SECURE SYSTEM AND METHOD FOR AUDIO PROCESSING

(71) Applicants: James A Cashin, San Luis Obispo, CA (US); David J Cogley, Arroyo Grande, CA (US)

(72) Inventors: James A Cashin, San Luis Obispo, CA (US); David J Cogley, Arroyo Grande, CA (US)

( * ) Notice: Subject to any disclaimer, the term of this patent is extended or adjusted under 35 U.S.C. 154(b) by 0 days.

(21) Appl. No.: 14/038,762

(22) Filed: Sep. 27, 2013

(65) Prior Publication Data

US 2014/0064495 A1    Mar. 6, 2014

(51) Int. Cl.
*G06F 21/00* (2013.01)
*G06F 21/62* (2013.01)

(52) U.S. Cl.
CPC ............ *G06F 21/62* (2013.01); *G06F 21/6209* (2013.01)
USPC ................ 713/193; 726/26; 726/27; 713/176

(58) Field of Classification Search
None
See application file for complete search history.

(56) References Cited

U.S. PATENT DOCUMENTS

| | | | |
|---|---|---|---|
| 6,275,239 B1 * | 8/2001 | Ezer et al. ...................... | 345/473 |
| 6,975,773 B1 * | 12/2005 | Govindaswamy et al. ... | 382/240 |
| 7,257,309 B1 * | 8/2007 | Elswick et al. ................ | 386/200 |
| 7,868,879 B2 * | 1/2011 | Rizko ............................ | 345/204 |
| 8,397,137 B2 * | 3/2013 | Frouin et al. .................. | 714/774 |
| 2003/0007643 A1 * | 1/2003 | Ben-Zur et al. ................ | 380/277 |
| 2005/0010790 A1 * | 1/2005 | Lang et al. .................... | 713/193 |
| 2005/0144466 A1 * | 6/2005 | Versteijlen et al. ........... | 713/189 |
| 2006/0053441 A1 * | 3/2006 | Walker ............................ | 725/30 |
| 2007/0033146 A1 * | 2/2007 | Hollar ............................ | 705/57 |
| 2009/0064267 A1 * | 3/2009 | Lee ................................ | 725/149 |
| 2012/0155653 A1 * | 6/2012 | Jax et al. ........................ | 381/22 |

OTHER PUBLICATIONS

Digital Cinema System Specification, Version 1.2, Digital Cinema Initiatives, LLC, Oct. 2012, pp. 1-155.*
Siegfried Fobel, The JPEG 2000 Suite, John Wiley & Sons, Inc., Sep. 2009, Chapter 9, pp. 251-272.*

* cited by examiner

*Primary Examiner* — Benjamin Lanier
(74) *Attorney, Agent, or Firm* — Andra M Vaccaro

(57) ABSTRACT

A method and system for playing movies with object-based sound complying with industry security standards using less processing power than the prior art, comprises an integrated media block in which, in non-real-time, encrypted audio files are decrypted. The object-based and channel-based audio data is then rendered to theater specific channels in non-real time. After the audio objects are rendered, the rendered audio is re-encrypted and stored for use at a later time. When the rendered movie is to be played in real time, the encrypted video and rendered encrypted audio files are streamed from the server, decrypted, forensically marked and played. Using the present invention, movies also can be downloaded and pre-processed while another movie is playing.

16 Claims, 3 Drawing Sheets

SECURE SYSTEM AND METHOD FOR AUDIO PROCESSING

BACKGROUND OF THE INVENTION

1. Field of the Invention

The invention relates to processing of channel-based and object-based sound in theaters, auditoriums and other viewing rooms that comply with DCI (Digital Cinema Initiatives), FIPS (Federal Information Processing Standards) and other security standards.

2. Background of the Invention

Throughout motion picture history, the sound and the picture have been processed for exhibition in individual processing devices. In the very early days of 35 mm film, the soundtrack was read from the film, its frequency response adjusted to compensate for In the very early days of 35 mm film, the soundtrack was read from the film; its frequency response adjusted to compensate for the non-linear frequency response used in recording and for imperfections in the film reader. In later years, a separate sound processor was added to adjust the frequency response (equalize) as required considering the acoustics of the room. As audio processing became more sophisticated, the audio processing unit also became more sophisticated by, among other things, overcoming time delays caused by the inherent time delay created by the audio processing equipment itself and the distance between the front and the rear of the theater.

With the advent of digital cinema, motion picture studios enhanced security by requiring that both the audio and the video be encrypted using a robust technology and that video and audio signals be forensically marked, also known as "watermarking." For cinema applications, forensic marking is required by industry standards to include the date, time and place where the movie is being played. AES-128 (Advanced Encryption Standard—128 bit) encryption, which is also used for financial transactions, was selected to secure the audio and video content during transport and storage. Movies are encrypted by the studios before they are sent to the cinemas or elsewhere for distribution in order to prevent piracy and other unauthorized use.

As the images are getting more precise, the number of sound channels also is increasing. Movies progressed from a single channel audio (mono) to stereo sound in which speakers were located behind the left and right sides of the screen. Later, "surround channels" were added, adding speakers to the sides of the theater and behind the audience. These are known as "channel-based" audio systems, which employ a distinct audio channel for each speaker (or group of speakers) in the auditorium. With the addition of more audio channels, for a given movie, sound editors place the sound in separate audio channels to drive the sound through specified speakers.

"Object-based" sound was then added to movies. With object-based sound, sound editors locate an individual sound (an audio object) so that it may be heard coming from a specific location within the three dimensional space of a theater.

The individual sound objects are made up of the actual sound and metadata which comprises sound attributes, including, but not limited to, the intended location of a sound object within a theater. In the prior art, the sound objects for a particular movie, including their associated metadata, are packaged along with the video of that movie. In the prior art, at theaters equipped with the necessary sound processing equipment and speakers, the audio processor renders the object-based audio along with theater specific configuration data to map the sound objects into one or more audio channels at correct levels to provide the intended sounds at the proper locations within the given theater. The conversion of the sound objects to theater specific audio channels based on the object's intended location and theater speaker locations is referred to in the art as "rendering".

Since the security of cinema content is extremely important in the movie industry to prevent piracy, the industry has required audio and video data either to be encrypted or forensically marked whenever the data is outside a secure integrated media block (IMB). In prior art channel-based implementations, the audio contents, including the related metadata, are encrypted while the sound is being stored on a server. During playback, the audio and video content is decrypted and forensically marked within the IMB and sent to the projector and sound system. Security is maintained since everything outside the media block is either encrypted or forensically marked.

With the advent of object-based audio, theaters must be able to play and forensically mark that object-based sound, as well. Some prior art methods utilize an IMB with the features shown in FIG. 1 and a non-standard enhanced audio processing unit (EAPU) that is specifically designed to decrypt, render and forensically mark the object-based audio. These EAPUs are costly and require a theater to replace their standard audio processing units (APU) because standard APUs cannot render the object based audio.

Because the rendering and forensic marking process takes place outside the media block, the EAPUs require a synchronization signal to synchronize the audio with the video image. In addition, the audio signals which are received from the server encrypted are decrypted within the EAPU.

The required decryption, object rendering, forensic marking, and synchronization add considerable complexity to the audio processing process. Further, using the systems in the prior art, movie audio has to be rendered in real time to ensure that the movie is secure especially because the security related functions are located in an external device instead of the secure media block. Thus, each time that the movie is viewed within the same theater, the object-based audio signals must be re-rendered to the audio channels and forensically marked.

Thus, it is desirable in the art to find a method and device to play movies with object-based sound that complies with industry required security measures and does not require that a theater replace its standard audio processor. It is also desirable in the art to provide a method of playing a movie that complies with industry required security measures that conserves processing power to minimize operating costs. It is further desirable in the art to find a method and device to play movies with object-based sound that complies with industry required security measures in which all decryption, encryption, object rendering and forensic marking may be done within a single secure IMB.

SUMMARY OF THE INVENTION

The present invention comprises a method and system which complies with industry security standards and which overall requires less processing power and complexity than the prior art.

In a preferred embodiment and method of the present invention, at any time prior to actual playback in real time, object-based audio signals are decrypted and rendered to channels in the IMB once, then re-encrypted and stored on a local server for later playback in real time as many times as required without the necessary for re-rendering the object-based audio. Thus, during each playback of the movie, the encrypted and pre-rendered audio only needs to be decrypted and forensically marked thereby conserving the power and overall processing time that would have been consumed had the audio had to be re-rendered each time that the movie is played back. A preferred embodiment and method of the present invention locates all object rendering, encryption, decryption and forensic marking functions within the secure IMB, instead of within a secondary audio processor.

In a preferred embodiment, the system of the present invention comprises an integrated media block (IMB) and a standard audio processing unit. In a preferred embodiment and method of the present invention, encrypted audio, video and metadata files are streamed from a cinema server and decrypted in non-real time within the IMB. A preferred embodiment and method of the present invention also renders the object-based audio files taking into account the dimensions of the theater in which the movie is to be shown, including, but not limited to, utilizing the number and locations of the speakers, so that the sound can be heard in the correct location in the three dimensional space within that theater. After the object-based audio is rendered to channels, the resulting rendered audio is encrypted for security purposes and streamed to a server for use at a later time. In a preferred embodiment and method, the rendered audio may comprise multichannel audio files.

In a preferred embodiment and method of the present invention, when a rendered movie is to be played, the video and rendered audio files are streamed from the server, decrypted, and forensically marked. The video is sent to the projector interface and the sound is sent to the APU for equalization, amplification, and playback through loudspeakers. In an alternate embodiment of the present invention, the standard audio processor unit functions, including but not limited to equalization, are subsumed within the IMB. In a preferred embodiment and method of the present invention, no external synchronization of the audio and video signals is necessary as the audio signals are rendered in the same IMB as the video signals such that they already are synchronized.

In an alternative method of the present invention, the equalization may also be completed in non-real time. Using the preferred embodiment and method of the present invention, movies also can be downloaded and preprocessed in the IMB while another movie is playing.

DETAILED DESCRIPTION OF THE DRAWINGS

As used herein, "downloading onto" or "streaming" shall be used interchangeably. Likewise, as used herein, "theater" shall be used to refer to a room, auditorium, or other venue in which a movie or other audiovisual presentation may be shown. Also, as used herein, "movie" shall refer to a movie, audiovisual presentation, video with sound, a short, cartoon, or the like. As used herein, "studio" shall refer to any source of a movie, whether an actual movie studio, advertiser, distribution company, or the like. Likewise, as used herein, "sig-nal" and "data" or "files" are used interchangeably, and "audio" and "sound" are used interchangeably.

Figure 1:
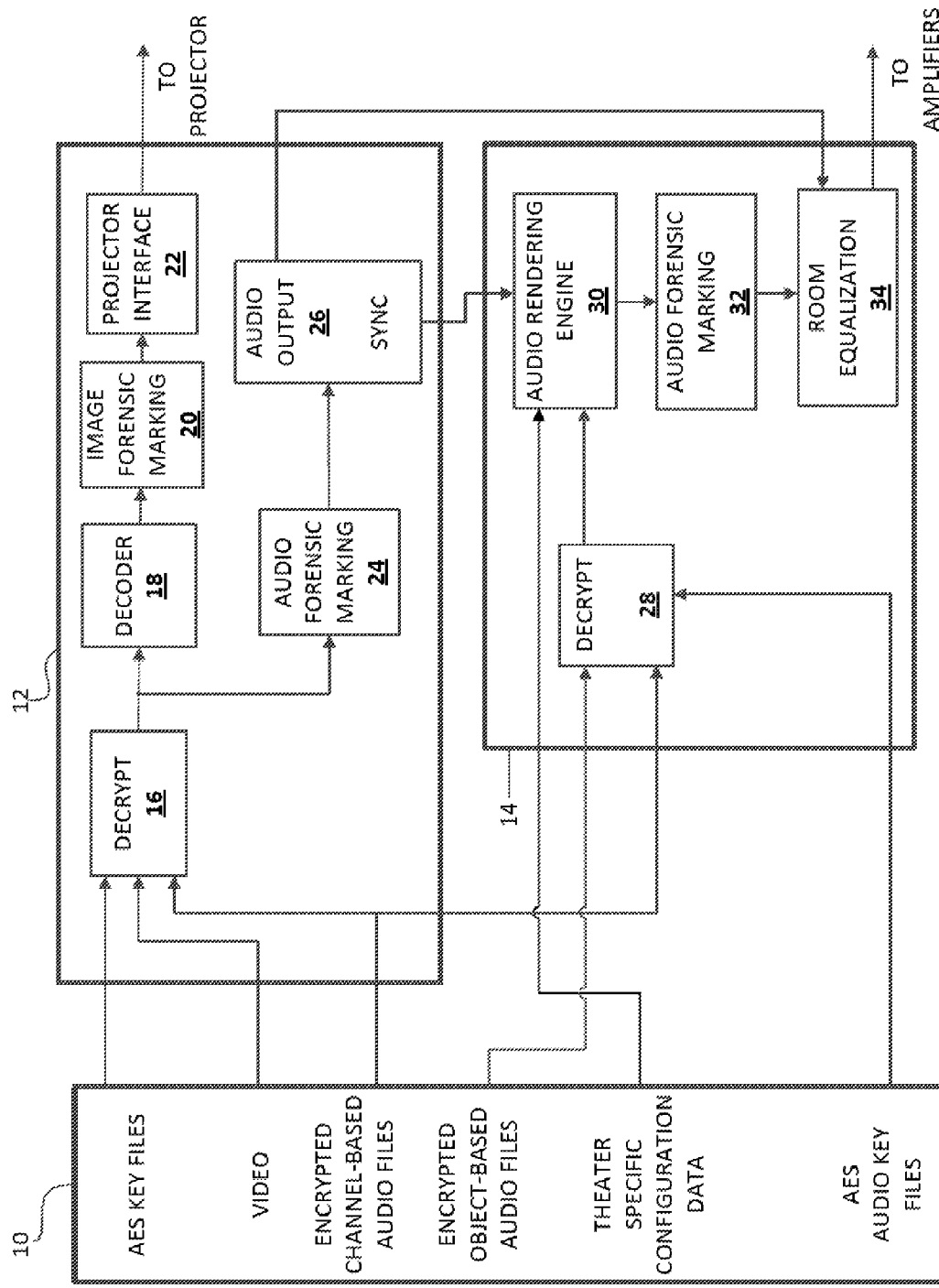
FIG. 1 is block diagram of the prior art.

Referring first to FIG. 1, an embodiment of the prior art is shown for illustrative purposes and is not otherwise claimed or considered to be part of the present invention. In the prior art, a theater may have a local server onto which a movie may be streamed directly from a studio while waiting to be placed within the theater. Alternatively, if the theater is part of a multiplex, the multiplex may have a library server that streams a movie to be shown in a particular theater of that multiplex to a local server for that particular theater.

As shown in FIG. 1, currently in the art, movies or other audiovisual data are streamed by a source such as a movie studio to a server 10. The data may comprise encrypted video files, encrypted channel-based audio files and encrypted object-based audio files. Also residing on the server 10 is theater specific configuration data that represents the three-dimensional (3D) configurations of the theater, as well as the specific location of each speaker located within the theater In the prior art, the encrypted visual data and the encrypted video secure keys are streamed in real time from the server 10 into an IMB 12. At the same time, the encrypted audio data (the channel and object-based data) and the encrypted secure audio keys are streamed into an enhanced audio processing unit 14 (EAPU). In the prior art, the audio keys and the video keys are different as they are used in different units.

Prior art IMBs comprise a decryption engine 16 which decrypts the video signals in real time, using secure keys that are different than the secure audio keys used in the EAPU, and then decodes the decrypted video using a decoder engine 18, also, in real time. Current industry standards require that the decoder be a JPEG2000 decoder. The video signal is forensically marked by engine 20 before it is sent to the projector interface 22. All of these functions are performed in real time.

Before the advent of object-based audio, the IMB also decrypted the channel-based audio files using secure keys received from the server, forensically marking them in an audio forensic marking engine 24 before being sent to the APU for equalization (not shown). Once the studios began using object-based audio files, EAPUs 14 were developed into which the channel-based and object-based audio files are streamed from a server 10 in real time with a time signal so that the video and rendered audio signals may be synchronized. In addition, the EAPU also has a decryption engine 28 that uses secure audio keys to decrypt the various channel based and object based audio files in real time. A file containing theater specific configuration data also is streamed into the EAPU for processing with the various audio files. The EAPU has an audio rendering engine 30 that manipulates the audio and configuration data so that sound comes from the intended direction and is synchronized with the video using a time synchronization engine. The EAPU uses a forensic marking engine 32 to forensically mark the rendered audio before it is equalized and amplified, if necessary, and heard through the speakers by the audience. All of these functions also are performed in real time.

EAPUs 14 are necessary because standard APUs that handle equalization do not have the capability to render object-based audio files or decode and use the theater specific information. EAPUs use a great deal of processing power because the movies have to be rendered in real time to comply with industry standards which require that the audio data is secure at all times. In addition, processing power is used keeping the audio signal synchronized with the video signal. Specifically, since object-based audio is not a continuous stream of audio directly corresponding to the stream of images but, instead, consists of discrete sounds with, among other attributes, the location of the sound and the time the sound is to be played, the EAPU needs an accurate indication as to what edit unit or frame is currently being projected so the corresponding sound is played. Further, many of the prior art APUs and EPAUs do not have any storage capabilities to store the rendered audio data for movies that, due to the size of the movie data files (movies are generally around 80 minutes or longer), are very large. Even if they did, the rendered files would not be secure within the EAPUs unless the EAPU met FIPS standards. Thus, to ensure that each movie is secure from piracy, each time that the same movie is played back, it must be re-rendered and forensically marked.

Figure 2:
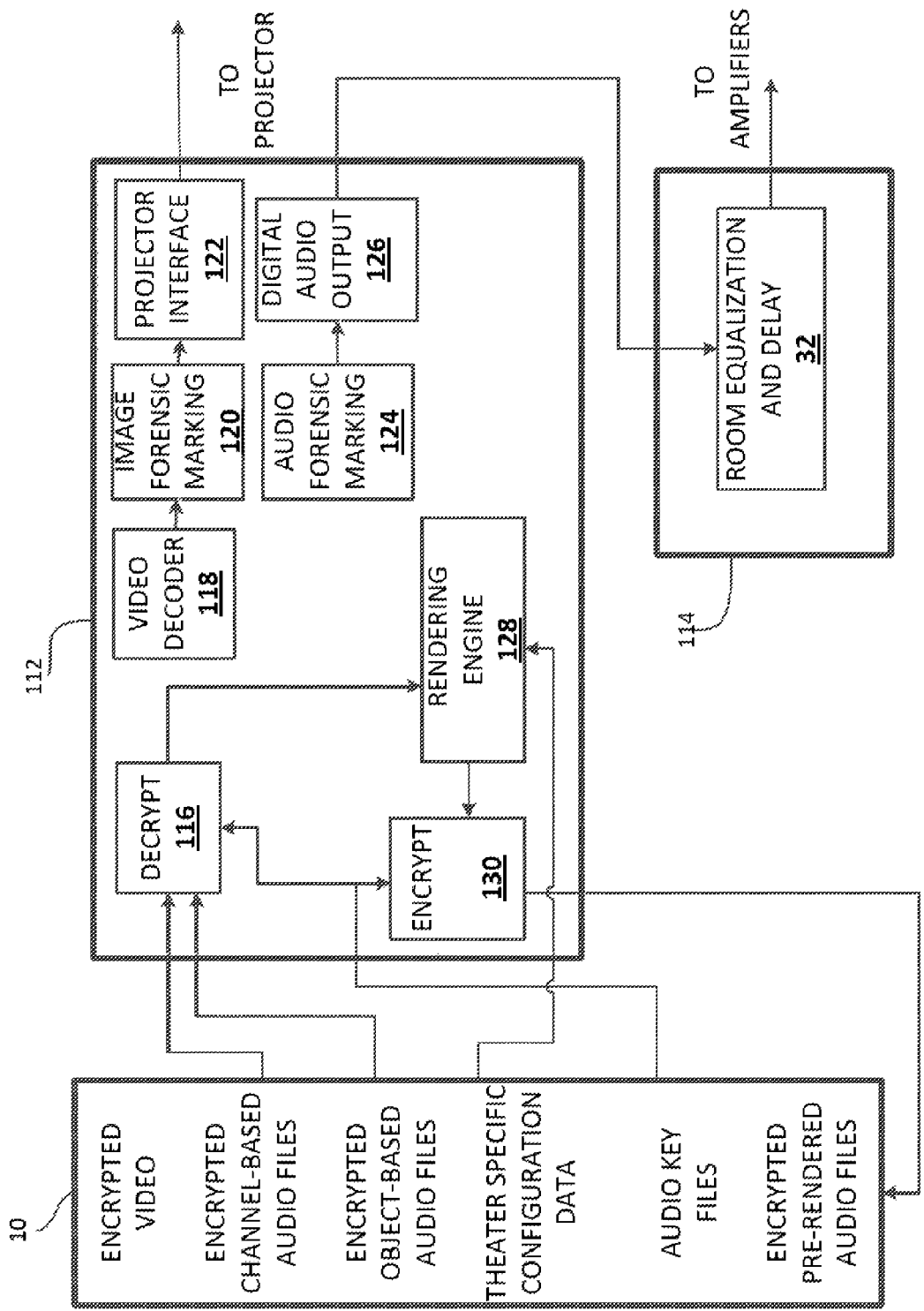
FIG. 2 is a block diagram of the system and method of a preferred embodiment of the present invention during rendering preprocessing.
Figure 3:
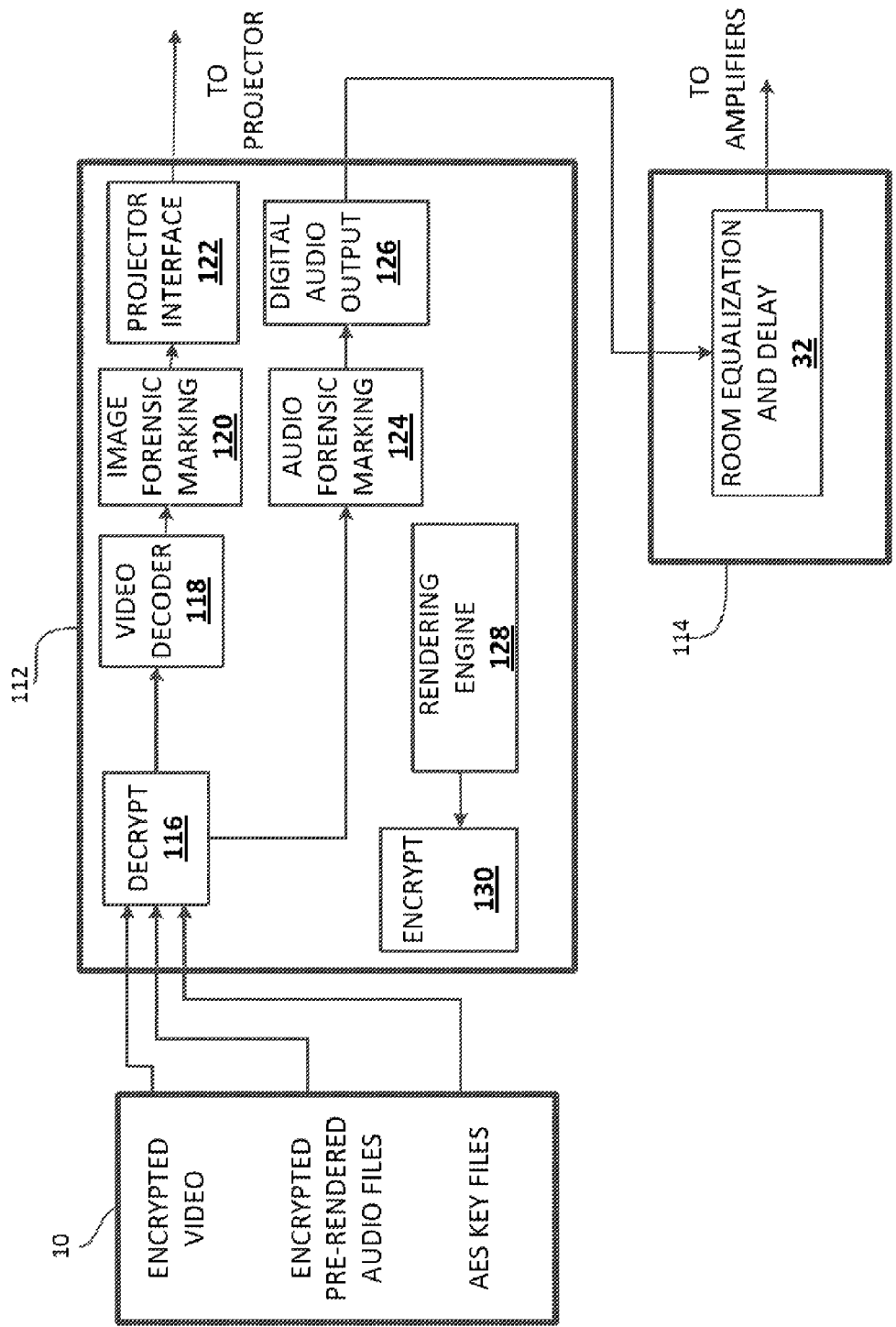
FIG. 3 is a block diagram of the system and method of a preferred embodiment of the present invention during playback of the movie with preprocessed audio.

Referring next to FIGS. 2 and 3, a preferred system and method of the present invention is shown in block diagram. The system 100 comprises an IMB 112 and an audio processing unit 114. However, in an alternate embodiment of the present invention, the IMB handles all of the necessary functions such that there is no need for an external APU or EAPU.

In FIGS. 2, and 3, a server 10 contains all of the encrypted files necessary to play a movie, including, but not limited to, the video, channel-based audio files, the object-based audio files, theater specific configuration data and the secure keys needed for decryption of the data files. The IMB 112 comprises a decryption engine 116 for decrypting video and audio signals using a single set of secure keys, a video decoder 118 (which in a preferred embodiment may be a JPEG2000 decoder, although any industry approved video decoder may be used) which decodes the video signal and a forensic marking engine 120 for marking the decoded video signal so that it contains at least the time, date and place and/or any other information required by the industry. Thereafter, the decoded forensically marked video signal is sent to the projector interface 122 which is connected to a projector (not shown.)

A preferred embodiment of the IMB 112 of the present invention also comprises an audio forensic marking engine 124 and a digital output interface 126 that is connected to either an external standard APU 114 (i.e. an APU that has at least an equalization engine 32) or to an internal equalization engine (not shown) within the IMB.

In a preferred embodiment of the present invention, the IMB 112 further comprises a rendering engine 128 which processes all of the decrypted channel and object-based audio files with the theater specific configuration data streamed from the server 10 to render a theater specific preprocessed audio data file. The rendered audio file is then encrypted using encryption engine 130 and stored on a local server. In a preferred embodiment the encryption engine 130 uses the same keys used to decrypt the original audio files and stored on a local server for playback at a later time.

Referring more specifically to FIG. 2, the first process of a preferred method of the present invention is shown. At any time prior to the showing of the movie in a specific theater, the encrypted audio files, such as the channel-based and object-based audio files, and the encrypted secure keys are streamed into the IMB 112. The invention anticipates that the movie can be downloaded days or weeks prior to showing it within the theater if desired. The encrypted audio files are streamed into a decryption engine 116 which decrypts the audio files which are then streamed along with the theater specific configuration data into a rendering engine 128 where the files are manipulated so that a rendered file(s) is created which comprises the soundtrack of the movie so that when played, the sound is optimally is heard in precise locations in the theater as intended by the studio.

The rendered files are then encrypted using the secure keys by the encryption engine 130 and stored on either the server 10 (or a dedicated local server, if desired) to be played back at a later time. Use of the same key ensures that studio playback restrictions remain in place. In a preferred embodiment and method, the rendered audio file is written as one or more single-channel or multi-channel audio files.

The present invention differs from the prior art in that all of the functions in the first process may be performed in non-real time. This has the advantage of requiring less processing power because it can be done at a slower rate than rendering the audio files in real time. It also saves processing power because the audio files need to be rendered once for that theater as the encrypted and stored rendered audio files may be used over and over.

Referring next to FIG. 3, the second process of a preferred method of the present invention is shown. When a rendered movie is to be played, in real time, the encrypted video and rendered audio files are streamed from the server, decrypted, forensically marked and the marked video files are sent to the projector interface while the pre-rendered audio files are streamed from the server, decrypted, forensically marked, equalized, amplified, and played back through loudspeakers. Specifically, the rendered audio file and the video files are streamed from the server 10 into the decryption engine 116 that decrypts the rendered audio file and the video files. Simultaneously, the video signal is decoded by the decoding engine 118 and streamed through the video forensic marking engine 120 to the projector interface 122 so it can be shown by the projector. Simultaneously, in real time, the decrypted pre-rendered audio file is forensically marked and handed off to a standard APU for equalization. Alternatively, if the IMB has its own equalization ability, there is no need for a separate APU.

Because the video and audio signals are processed within the same IMB, they are inherently synchronized.

Because the present invention causes the encrypted rendered audio files for each theater to be stored on the server until playback time, the un-rendered audio files do not need to be re-rendered each time the movie is shown. Since industry standards require that the rendered audio and the video be forensically marked in real time, the amount of power consumed by the present invention is less than in prior art embodiments and methods which use a large amount of processing power to re-render the audio each time the movie is shown. The present invention also uses the same key to ensure that studio playback restrictions remain in place, while the prior art requires a separate key in the EAPU that may not have the same studio playback restrictions.

However, although a preferred embodiment and method of the present invention decrypt, render and encrypt the audio files in non-real time, these functions still can also be used in real time. In addition, using a preferred embodiment and method of the present invention, a movie may be played back while another movie is being processed for viewing at a later time. It is also expected that the present invention will permit theaters to utilize standard APUs rather than an EAPU.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A method of playing back object-based audio files comprising:
    Non-real time rendering of the audio files within an integrated media block,
    Non-real time storage of the rendered audio files as at least one single-channel or multi-channel audio file, and
    Playing back the stored rendered audio files within the integrated media block in real time.

2. The method of claim 1, wherein the non-real time rendering of the audio files comprises:
    Obtaining channel-based and object-based audio files from a storage location where they reside;
    Obtaining data files containing the three dimensional configuration of the theater and the sound system from a storage location where they reside; and
    Manipulating the channel-based and object-based audio files with the configuration data files to create the at least one single-channel or multichannel rendered audio file.

3. The method of claim 1, in which the object-based audio files are received by the media block encrypted, further comprising:
    Non-real time decrypting the object-based audio files prior to rendering them and encrypting the rendered audio files prior to storing them, and decrypting the stored rendered audio files during playback in real time.

4. The method of claim 3 wherein each of the decryption and encryption steps use the same keys.

5. The method of claim 1 further comprising the step of forensically marking the rendered audio files they are played back in real time.

6. A method for playing back encrypted audio signals of a movie in a movie theater comprising:
    Decrypting the audio signals in non-real time;
    Rendering the audio signals within a media block in non-real time;
    Encrypting the rendered audio signals within a media block in non-real time; and
    Storing the encrypted rendered audio signals for later playback in real time;
    Whereby each time that the movie is played in that theater, the encrypted rendered audio signals are decrypted in real time within the media block as they are being played back.

7. The method of claim 6 wherein the decryption and encryption steps use the same secure keys.

8. The method of claim 6, wherein the original encrypted audio signals comprise channel-based and object-based audio signals residing on a server, and wherein the server also contains data regarding the specific three dimensional configuration of the theater in which the movie is to be played, the rendering step comprising creating at least one spatially rendered audio file customized for that theater by manipulating the channel and object-based audio using the data regarding the configuration of that theater such that when the audio is played back in that theater, the sound comes from specific locations within that theater in accordance with the metadata included in the sound objects.

9. The method of claim 6, wherein all of the steps are performed within a single integrated media block.

10. The method of claim 6, wherein the rendered audio files are equalized prior to re-encryption and being stored.

11. An integrated media block for playing in real time, a movie having channel-based and object-based audio files, comprising:
    a processor, comprising:
    a decryption engine for decrypting in both real and non-real time encrypted audio files of the movie;
    a rendering engine for rendering in non-real time the channel based and object-based audio files and data representing the three dimensional space of the specific theater in which the movie is to be shown,
    an encryption engine capable of non-real time encryption of the rendered audio files prior to their being stored for playback at a later time,
    whereby the stored encrypted rendered audio files are secure while they are being stored and are available for instantaneous decryption in real time within the integrated media block as they are being played back.

12. The integrated media block of claim 11, wherein the processor further comprises at least one forensic marking engine for forensically marking the rendered audio files as they are being played in the theater.

13. The integrated media block of claim 11 in which the audio and video files are decrypted using a single key delivery mechanism.

14. The integrated media block of claim 11 in which the decryption and encryption engines use the same keys.

15. The integrated media block of claim 11 further comprising an equalizer for equalizing the decrypted rendered audio signals prior to their being encrypted for storage and later playback.

16. The method of claim 6, whereby each time that the movie is played in that theater, the decrypted rendered audio signals are forensically marked in real time within the media block as they are being played back.

* * * * *